United States Patent
Aoki

(10) Patent No.: US 6,465,038 B2
(45) Date of Patent: Oct. 15, 2002

(54) TRAY FOR PREPARING SUSHI AND PROCESS FOR PREPARING SUSHI USING SAID TRAY

(75) Inventor: Minoru Aoki, Fukuoka (JP)

(73) Assignee: Fuji Seiko Co., Ltd., Fukuoka (JP)

( * ) Notice: Subject to any disclaimer, the term of this patent is extended or adjusted under 35 U.S.C. 154(b) by 0 days.

(21) Appl. No.: 09/775,608

(22) Filed: Feb. 5, 2001

(65) Prior Publication Data

US 2001/0011657 A1 Aug. 9, 2001

(30) Foreign Application Priority Data

Feb. 4, 2000 (JP) ........................................ 2000-028242

(51) Int. Cl.[7] ........................... A23L 1/325; A23L 1/10; A23P 1/10
(52) U.S. Cl. ...................... 426/643; 426/392; 426/398; 426/402; 426/512
(58) Field of Search ................................. 426/398, 402, 426/643, 392, 394, 119, 512, 129, 115; 220/575, 23.86, 23.89, 571

(56) References Cited

U.S. PATENT DOCUMENTS

| | | | | |
|---|---|---|---|---|
| 4,167,080 A | * | 9/1979 | Mickelson | 47/71 |
| 5,139,166 A | * | 8/1992 | Smith | 220/574 |
| 5,372,274 A | * | 12/1994 | Freedland | 220/571 |
| 5,869,120 A | * | 2/1999 | Blazevich | 426/132 |

FOREIGN PATENT DOCUMENTS

| | | | | |
|---|---|---|---|---|
| EP | 1005798 A2 | * | 6/2000 | |
| JP | 357005658 A | * | 1/1982 | |
| JP | 402069151 A | * | 3/1990 | |
| JP | 404131055 A | * | 5/1992 | |
| JP | 406072481 A | * | 3/1994 | |
| JP | 07000129 | * | 1/1995 | |
| JP | 08214804 A | * | 8/1996 | |
| JP | 09327280 A | * | 12/1997 | |
| JP | 02001008647 A | * | 1/2001 | |

* cited by examiner

*Primary Examiner*—Milton I. Cano
*Assistant Examiner*—Robert Madsen
(74) *Attorney, Agent, or Firm*—Shanks & Herbert

(57) ABSTRACT

A tray set composed of a first tray and a second tray, wherein the first tray having a plurality of depressed portions in which sushi toppings can be placed and which each has a shape having a depth so as to fill it with the sushi topping and a portion of a lump of rice seasoned with vinegar. The first tray is provided with a plurality of holes on the bottom so as for liquid dropped or oozed out from the toppings to be discharged therethrough. The second tray is arranged such that it can be laid under the first tray and the liquid discharged from the first tray can be received by a depressed face, and a plurality of projections are formed continually and integrally with the depressed face and the plurality of the projections are disposed so as to be engageable with the holes of the first tray and to project through the holes inside the first tray, when the second tray is laid under the first tray. The projections assist in separating the sushi from the tray. The tray set and the process for preparing sushi by using the tray sets do not require any experience and skills for preparing sushi and can prepare a number of sushi with high efficiency and at cheaper costs in a short time.

8 Claims, 8 Drawing Sheets

TRAY FOR PREPARING SUSHI AND PROCESS FOR PREPARING SUSHI USING SAID TRAY

BACKGROUND OF THE INVENTION

1. Field of the Invention

The present invention relates to a tray set for use in preparing sushi and to a process for preparing sushi using the tray set.

2. Description of the Related Art

Typically, "sushi" referred to herein is a lump of boiled rice seasoned with vinegar and having a sushi topping such as a piece of sliced fish flesh or any other topping placed on top. Generally, hand-made sushi may be prepared by a cook having skills and prolonged experience. On the other hand, a tray for preparing rolled sushi is used as a frame to prepare rolled sushi. The process for preparing rolled sushi by using such a sushi-preparing tray does not require skilled cooks and can provide rolled sushi of a uniform quality and shape and in a short time. The sushi-preparing tray as a frame is provided with a plurality of depressed portions each having a rectangular shape corresponding to a shape of sushi. A predetermined amount of boiled rice is placed in the form of a lump into each depressed portion of the sushi-preparing frame, and then a topping such as, for example, a piece of fish or shellfish, e.g., a slice of tuna, sea bream, bonito or cuttlefish, shrimp, oyster, sea urchin or otherwise, vegetables or sea weed, such as horse radish sprouts or otherwise, etc. is placed on the rice lump placed in each depressed portion. The rice lump with the topping on top thereof is then pressed into a piece of rolled sushi that allows the topping to loosely attach to the rice lump, and the piece of the rolled sushi is then removed from the sushi-preparing frame. The sushi-preparing frame can prepare plural pieces of rolled sushi at one time.

The use of such a sushi-preparing frame allows rolled sushi to be prepared readily and quickly at a sushi corner in a super market or department store or any appropriate place without using the hands of a cook having long-experienced skills. Further, such a sushi-preparing frame can prepare a number of pieces of rolled sushi at one time which otherwise have to be prepared by plural sushi cooks.

Such a conventional frame for use in preparing rolled sushi, however, carries some problems. The toppings such as a slice of fish flesh, sea weed, vegetables or the like may contain a lot of water or juices so that, when they are allowed to stand for a while, liquid is allowed to drop or ooze out from the toppings, resulting in sushi becoming too watery and spoiling a quality of sushi and eventually a value of sushi as goods.

Further, when sushi is prepared by means of a conventional sushi-preparing tray, a piece of pressed sushi is often unlikely to be taken out from the tray or some grains of boiled rice are left attached on the surface of the tray resulting in the breakdown of a shape of sushi and losing the value of v sushi as goods. Such a piece of sushi cannot be solid as goods any more. Further, if time would be spent to take pieces of pressed sushi out from the tray, labor efficiency will be decreased as a matter of course.

As a matter of course, labor is required for preparing sushi by using a sushi-preparing tray. If, however, labor would be used over the entire course or a majority of the course of the preparation of sushi even if using such a sushi-preparing tray, labor efficiency will be decreased greatly.

SUMMARY OF THE INVENTION

Therefore, the present invention has an object to overcome the problems inherent in conventional sushi-preparing technology and to provide a sushi-preparing tray suitable for use in preparing sushi.

The present invention has another object to provide a method for preparing sushi using a sushi-preparing tray.

In order to achieve the object, the present invention in an aspect provides a sushi preparing tray set comprising a first tray and a second tray; the first tray comprising a plurality of depressed portions each having a depth that can receive a slice of fish flesh or any other topping and a lump of boiled rice seasoned with vinegar placed thereon and having a small aperture through which drips or water from the sliced fish flesh or other topping can be removed from the depressed portion, and the second tray having a depressed face that receives drips or water discharged through the small aperture of the first tray, when the second tray is laid underneath the first tray, and having a plurality of raised portions formed continually and integrally with the depressed face and so adapted as to protrude inside the first tray through the small aperture thereof in a state in which the second tray is laid under first tray.

In a preferred mode of this aspect of the present invention, the sushi-preparing tray set is configured such that a row of depressed portions are disposed in the transverse direction of the first tray by locating a plurality of depressed portions in a spaced relationship apart at a predetermined interval and a plurality of rows of depressed portions are disposed in a spaced relationship apart in a predetermined interval in the longitudinal direction of the first tray; and such that each depressed portion in each row is formed at a predetermined angle with respect to virtual longitudinal coordinate of the first tray, when looked in section, that is, each depressed portion is formed so as to become gradually narrower from the top toward the bottom.

In another aspect according to the present invention, there is provided a method for preparing sushi by using the sushi-preparing tray set as disclosed in the one aspect, which comprises: the first step of placing a slice of fish flesh or any other topping in each depressed portion of the first tray of the sushi-preparing tray set as described above; the second step of placing a lump of boiled rice seasoned with vinegar onto the slice of fish flesh or any other topping placed in each depressed portion; the third step of pressing the lump of rice from top so as to attach the rice lump to the topping; the fourth step of covering pieces of sushi formed on the sushi-preparing tray set with a packaging material and turning the sushi-preparing tray set upside down to allow the pieces of sushi to be detached from each depressed portion of the first tray; and the fifth step of detaching the sushi-preparing tray set from the pieces of sushi and wrapping the piece of sushi with a packaging material to yield a sushi pack.

In a preferred mode of this aspect of the present invention, the work of locating a lump of boiled rice seasoned with vinegar into each depressed portion of the first tray with the topping such as sliced fish flesh or other topping placed therein is carried out by a robot having required functions.

In another preferred mode of this aspect of the present invention, a small amount of a seasoning, such as spice, e.g., wasabi, i.e., Japanese horseradish, is coated on the bottom surface of the topping placed in a first depressed portion of the first tray as another lump of rice is placed into a second depressed portion of the same tray disposed adjacent the first depressed portion thereof.

DETAILED DESCRIPTION OF THE PREFERRED EMBODIMENTS

Figure 1:
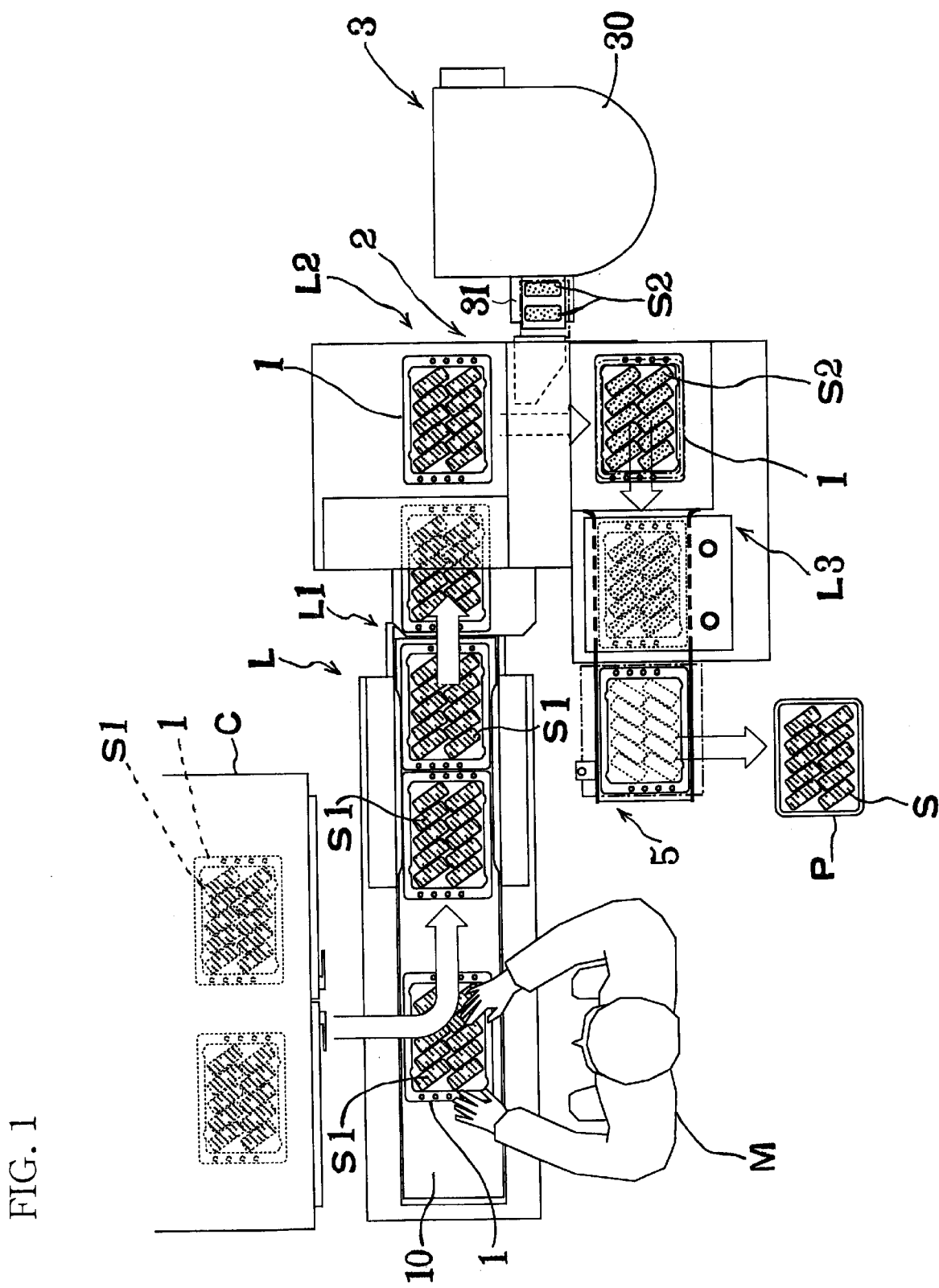
FIG. 1 is a view explaining a line carrying out a method for preparing sushi in accordance with an embodiment of the present invention, when looked from top.

The sushi-preparing tray set for preparing sushi according to an embodiment of the present invention is of a double tray structure consisting of a first tray as a top tray and a second tray as a bottom tray to be disposed underneath the first tray, the first tray being provided with a plurality of depressed portions in each of which a topping, such as a slice of fish flesh or any other topping, is placed therein and a lump of boiled rice seasoned with vinegar is superimposed over the topping and the second tray being laid under the first tray.

Each of the plural depressed portions formed in the first tray may be in a generally rectangular shape and have a depth that can receive a slice of fish flesh or any other topping and a lump of rice seasoned with vinegar superimposed over the slice of fish flesh or another topping. Further, each of the depressed portions may be provided in its bottom portion with a small aperture through which drips or other liquid dropped or oozed out from the topping, i.e., the slice of fish flesh or any other topping disposed in the depressed portion thereof can be discharged outside from the first tray into the second tray. And each depressed portion of the first tray may preferably be configured such that it can accommodate the rice lump placed on the topping so as for the top surface of each rice lump to become higher than the top surface of the first tray yet lower than the bottom surface of the second tray so as for the top surface of each rice lump to fail to come into touch with the bottom surface of the second tray after the rice lump has been pressed into a piece of sushi when the second tray is laid under the first tray.

A plural number of the depressed portions may be arranged in a row in an equally spaced relationship in the transverse direction of the first tray. Likewise, a row of the depressed portions may be arranged in plural numbers in an equally spaced relationship parallel to the row, that is, in a longitudinal direction of the first tray.

Furthermore, each of the depressed portions may be formed as an opening that in turn may be configured such that the opening in section is tapered at a constant angle so as for each side to become gradually narrower toward the bottom. A number of the depressed portions can be arranged effectively in a constant area of the first tray. For instance, eight to twelve depressed portions may be formed in the first tray and eight to twelve pieces of sushi can be prepared at one time. It is to be noted herein, however, that the number of the depressed portions is not restricted to those particular numbers and may be varied.

On the other hand, the second tray may be formed so as to receive the first tray disposed on top so that the first tray can be laid over the second tray. Therefore, when the first tray is superimposed over the second tray, the first and second trays may be formed integrally as one tray. More specifically, the second tray comprises a flat depressed bottom face that can receive and gather drips and any liquid dropped or oozed out from the apertures disposed in the depressed portions of the first tray through which the drips and the liquid are discharged from the first tray. The second tray is further provided with raised portions that correspond to the apertures formed in the depressed portions of the first tray and that can penetrate through the corresponding apertures and protrude inside the first tray through the apertures thereof, when the first tray is superimposed over the second tray.

The raised portions may be disposed so as for their upper portions to be inserted through the corresponding apertures formed in the first tray and to protrude therethrough upwardly to some extent inside the corresponding depressed portions of the first tray, when the first tray is laid over the second tray. When the first tray is superimposed over the second tray so as for the raised portion s of the second tray to be inserted into the apertures of the depressed portions formed in the first tray and to protrude upwardly inside the depressed portions of the first tray, the contents of the depressed portions of the first tray are allowed to come into contact with the top sections of the raised portions of the second tray protruding from the bottom of the depressed portions of the first tray and to be raised to some extent therefrom. Therefore, this configuration of the sushi-preparing tray set according to the present invention can assist in detaching pieces of sushi from the bottom of the depressed portions of the first tray without breaking the entire shape of sushi.

Now, a brief description will be given regarding the method for the preparation of sushi using the sushi-preparing tray set according to the present invention.

The method for the preparation of sushi according to the present invention may comprise combining the first and second trays into the sushi-preparing tray set according to the present invention, boiling a given amount of rice and seasoning boiled rice with vinegar and other seasonings, preparing lumps of boiled rice seasoned with vinegar and other seasonings, placing a topping such as a slice of fish flesh or other topping in each of the depressed potions of the first tray, placing a lump of rice onto the topping placed in the depressed portion of the first tray, placing or supplying a small amount of a seasoning, such as spice, e.g., wasabi, as needed, on the topping placed in the depressed portion of the first tray, pressing the rice lump onto the topping placed in the depressed portion of the first tray so as to allow the rice lump to loosely attach to the topping, turning the tray set upside down, together with a set of pieces of sushi located on the first tray, and removing the tray set from the set of pieces of sushi.

As a preparatory work, the first tray and the second tray are combined together to form the sushi-preparing tray set according to the present invention. The first and second trays may be combined immediately before preparing sushi upon order or may be stored in a refrigerator after placing the topping including, e.g., a slice of fish flesh or other topping in the first tray.

The depressed portions of the: first tray of the tray set is then filled with toppings such as slices of fish flesh and any other suitable toppings, as preset or requested, manually by hand or automatically by a robot. Typically, different kinds of toppings are used for all pieces of sushi arranged on one tray. It is possible to set a robot so as to arrange all different kinds of toppings in the depressed portions in one tray, however, the use of such a robot for an automatic sushi making machine may require a large amount of investment for machinery and eventually raise costs of pieces of sushi. In a majority of cases, it may be better to place the different toppings in the depressed portions of the first tray by hand so as to comply with a consumer's request and so on, in order to save costs of investment for machinery or plant and reduce costs of preparation of pieces of sushi.

On the other hand, lumps of boiled rice may be prepared by means of a conventional rice-lump preparing machine that can prepare a number of rice lumps at one time. This kind of the machine is suitable for preparing a number of rice lumps in a short time although such boiled rice lumps can be prepared by hand. The use of such an automated rice-lump preparing machine is preferably suitable for automation of the preparation of sushi and, as a matter of course, this can save a lot of labor and time, improving efficiency and workability to a great extent.

Then, the rice lumps so prepared are transferred to a sushi-preparing tray set by hand or with a robot and a rice lump is placed onto the topping placed in each of the depressed portion of the first tray of the tray set one after another. For the work of placing rice lumps in the depressed portions thereof, the robot is particularly suitable for preparing sushi in a large number in a short time. The manual work can also be conducted particularly to prepare sushi in a small number in a very short time.

The robot for use in transferring the rice lumps from the rice-lump preparing machine to the tray sets and placing them in the depressed portions of the first tray may comprise a hand section that can clamp a rice lump at the rice-lump preparing machine and transfer it to a predetermined position of the depressed portion of the first tray. As the rice lump has been transferred to the predetermined depressed portion thereof, the hand section of the robot releases the rice lump on the topping in the depressed portion. This work is repeated to fill the tray set with a predetermined number of rice lumps, that is, to fill a required number of the depressed portions with the rice lumps.

In accordance with the embodiment of this invention, the seasoning such as spice, e.g., wasabi, i.e., Japanese horseradish, may be placed or coated, as requested, on the topping placed in the depressed portion thereof, for example, by means of a seasoning supply unit, as the rice lump is placed in each of the depressed portions of the first tray. In a preferred mode of this embodiment, a seasoning supply unit may be installed to the robot for placing the rice lump in each of the depressed portions of the first tray so as to enable placing or supplying a small amount of a seasoning, such as spice, e.g., wasabi, on the topping placed in the depressed portion thereof. In this mode of the embodiment, the seasoning supply unit is disposed nearby the hand section of the robot and arranged so as to place or coat the seasoning on the topping as the hand section of the robot is being placing a rice lump into another depressed portion of the first tray. In this case, it is better to set the interval between the seasoning supply unit and the hand section of the robot to comply with the interval between the adjacent depressed portions of the first tray. In order to conduct a series of this work effectively and efficiently, the robot is preferably arranged so as to operate the hand section to conduct the first stroke without clamping any rice lump simply by allowing the seasoning supply unit to supply a given amount of a seasoning, such as spice, e.g., wasabi, to the topping placed in the first depressed portion of the first tray. At the second stroke of transferring a rice lump from the rice-lump preparing machine to the tray set, the hand section of the robot clamps another rice lump at the rice-lump preparing machine and carries it to the first depressed portion where the topping has already been supplied with the seasoning. At this time, the seasoning supply unit is located above the second depressed portion of the first tray. As the hand section of the robot then releases the rice lump on the topping in the first depressed portion, the seasoning supply unit supplies a small amount of the seasonings onto the topping placed in the second depressed portion thereof. This operation is repeated to allow all the depressed portions of the tray set to be filled with the rice lumps. At the last stroke of the hand section of the robot, the seasonings supply unit is set to fail to supply any amount of the seasonings because it is located outside the tray set at this time. If no seasoning is requested, the seasonings supply unit can be set so as to supply no seasoning to the first tray. The concurrent operations of placing rice lumps on the tray set and supplying the seasoning thereon can remarkably improve the efficiency of preparing sushi.

After the rice lumps have been placed in all the depressed portions of the first tray, then they are pressed somewhat to allow the rice lumps and the toppings placed thereunder and in the depressed portions thereof to loosely attach to each other yet for each piece of sushi to fail to easily separate the topping from the rice lump. The pressing may be effected by means of a device with a special type of a mold having substantially the same size of the upper portion of each piece of sushi located on the first tray of the tray set, thereby shaping each piece of sushi.

The tray set with the pieces of sushi located thereon is covered with a packaging material such as a package that may function as a bottom package section, and then turned upside down, and the tray set is detached leaving the pieces of sushi on the packaging material. The pieces of sushi located on the packaging material are then covered with another packaging material, e.g., a top package section, to produce a sushi pack containing plural pieces of sushi with different kinds of toppings on top.

With the arrangement as described above, a large number of sushi with the topping placed thereon can be prepared efficiently in a short time in a generally automated manner even without skilled cooks, while maintaining a uniform yet high quality.

The present invention will be described in more detail by way of examples with reference to the accompanying drawings.

FIG. 1 shows a sushi production line for carrying out the method for the preparation of sushi by using a tray set in accordance with the present invention. The sushi production line L may comprise a tray carrying line L1 for transferring tray sets, a rice lump filling line L2, and a press-turning line L3.

The tray carrying line L1 comprises a belt conveyor 10 to carry a tray set 1 to a robot 2 after the tray sets have been pre-prepared. The tray set 1 for use in preparing sushi according to this embodiment of the present invention will be described later in more detail. The robot 2 is disposed on the last end side of the belt conveyor 10. The tray set 1 is first filled with toppings S1 while it is being carried on the. belt conveyor 10, although this operation will be described later in more detail.

The rice lump filling line L2 is provided with a robot 2 that can fill rice lumps S2 in the depressed portions of the tray set 1 which have already been filled with the toppings S1, while the tray set 1 is being conveyed by means of the tray carrying line L1 in the direction crossing the rice lump filling line L2.

In this embodiment, a rice-lump preparing machine 3 is disposed nearby behind the robot 2 to produce rice lumps S2. The rice-lump preparing machine 3 is provided with a group of rollers having a pair of rollers per row disposed in plural rows and with a shaping mold disposed under the group of the rollers, the machine having a rice box or container 30 disposed on top which is filled with boiled rice. The boiled rice is supplied downwards from the rice box or container 30 and expanded in the form of a belt by means of the rollers. The rice in the belt form is further transferred downwards, followed cutting the rice into a predetermined size with a cutter section disposed on the shaping mold and then shaping the cut amount of rice into a rice lump S2. The shaped rice lumps S2 are then transferred to a predetermined position by means of a conveyor section 31. The rice-lump preparing machine 3 may be provided with a pair of the rollers groups and the shaping molds, and with a rice dividing section for dividing the rice supplied from the rice box or container into two streams each in the form of a belt. The divided streams of rice are processed in Substantially the same manner as described immediately above, so that two lumps S2 of boiled rice can be prepared at the same time.

The press-turning line L3 contains a pressing unit 4 (see FIG. 11) and a turning unit 5, and the pressing unit 4 is of a shape corresponding to a shape of sushi so as to press the rice lump from top and shape the rice lump to a piece of sushi. The turning unit 5 is arranged to turn the tray set 1 with the pressed sushi rolls filled therein upside down after covering the pressed sushi lumps in the tray set 1 with a package P functioning as a sushi container. In FIG. 1, reference symbol C refers to a refrigerator accommodating the tray sets 1 with toppings, such as slices of fish flesh or other toppings inserted in the depressed portions of the first tray, reference symbol M refers to an operator, and reference symbol S refers to completed sushi lumps.

Now, a description will be given below regarding the configuration of the tray set 1 according to the present invention with reference to FIGS. 2 to 8. In this embodiment, the tray set 1 is made of a synthetic resin although the material for the tray set is not restricted to a particular one and a metallic material such as aluminum foil may also be used. Further, the surface of the tray set 1 may be processed by antibacterial coating procedures.

Figure 2:
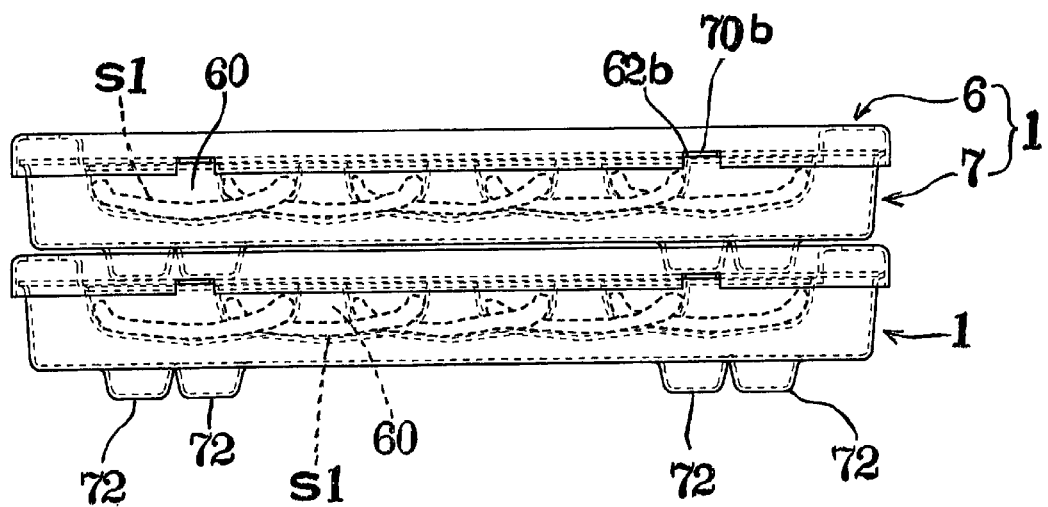
FIG. 2 is a side view showing an outline of a sushi-preparing tray set according to an embodiment of the present invention.

As shown in FIG. 2, the tray set 1 may comprise a top tray 6 as a first tray and a bottom tray 7 as a second tray, and the top tray 6 is superimposed over the bottom tray 7 and assembled therewith. Moreover, the tray set 1 can be laid on another tray set one after another in plural rows.

Figure 3:
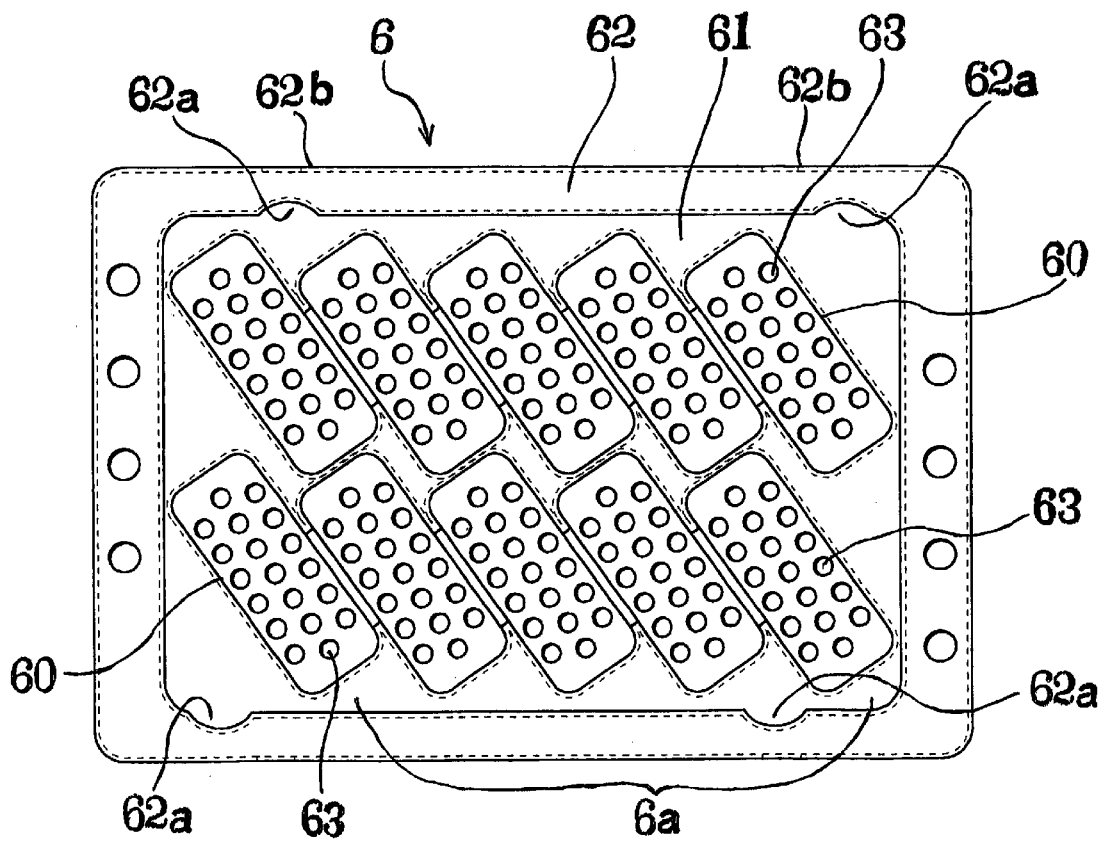
FIG. 3 is a plan view showing a top tray of the sushi-preparing tray set according to the embodiment of the present invention.
Figure 4:
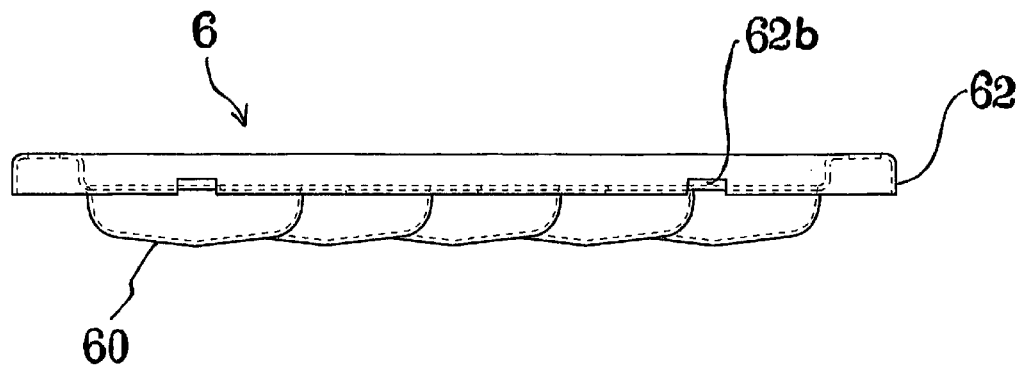
FIG. 4 is a side view showing the top tray of the sushi-preparing tray set according to the embodiment of the present invention.

As shown in FIGS. 3 and 4, the top tray 6 comprises an area 61 where a plurality of depressed portions 60 are disposed, a flange section 62 disposed integrally around the area 61, and foot-accommodation depressed portions 62a disposed inside the flange section 62 at which corresponding foot portions 72 disposed on the bottom tray 7 are to be accommodated. Further, the top tray 6 is provided with cut-away portions 62b on the outer hanging edge section of the flange section 62. Upon superimposing the top tray 6 over the bottom tray 7, an engaging section 70b provided on the bottom tray 7 can be engaged tightly with the corresponding cut-away portion 62b so as to allow a ready superimposition of the first tray over the second tray.

The top tray 6 is provided with the plural depressed portions 60 on the area 61, and each depressed portion 60 is shaped in a generally rectangular form so as to accommodate a topping S1 such as a slice of fish flesh or any other topping, as requested. Each of the depressed portions 60 is rendered gradually narrower from the top opening area toward the bottom area and has a depth in which the rice lump S2 can be placed on the topping S1, as shown in FIG. 4. Further, each depressed portion 60 is provided on the bottom with a plurality of holes 63 through which liquid dropped or derived from the topping S1 and so on can be discharged, as shown in FIG. 3. The holes 63 are composed of small openings through which blood or other liquid oozed out from the toppings such as fish flesh and so on is discharged from the depressed portion 60. The holes 63 can prevent sushi from becoming too watery and sustain a high quality as sushi.

Moreover, the area 61 of the top tray 6 is provided with a predetermined number of the depressed portions 60 in a row 6a (in this embodiment, five depressed portions per row being disposed in two rows) in a spaced relationship apart at a constant distance in the lengthwise direction. The row 6a of the depressed portions 60 is disposed in plural numbers at a constant interval in the widthwise direction (in this embodiment, two rows are depicted). In addition, in this embodiment, each row 6a of the depressed portion 60 is disposed at a constant angle with respect to the parallel sides of the top tray 6, when looked in a plane. This allows an efficient arrangement of the plural depressed portions 60 on the top tray 6 so as to prepare plural pieces of sushi.

Figure 5:
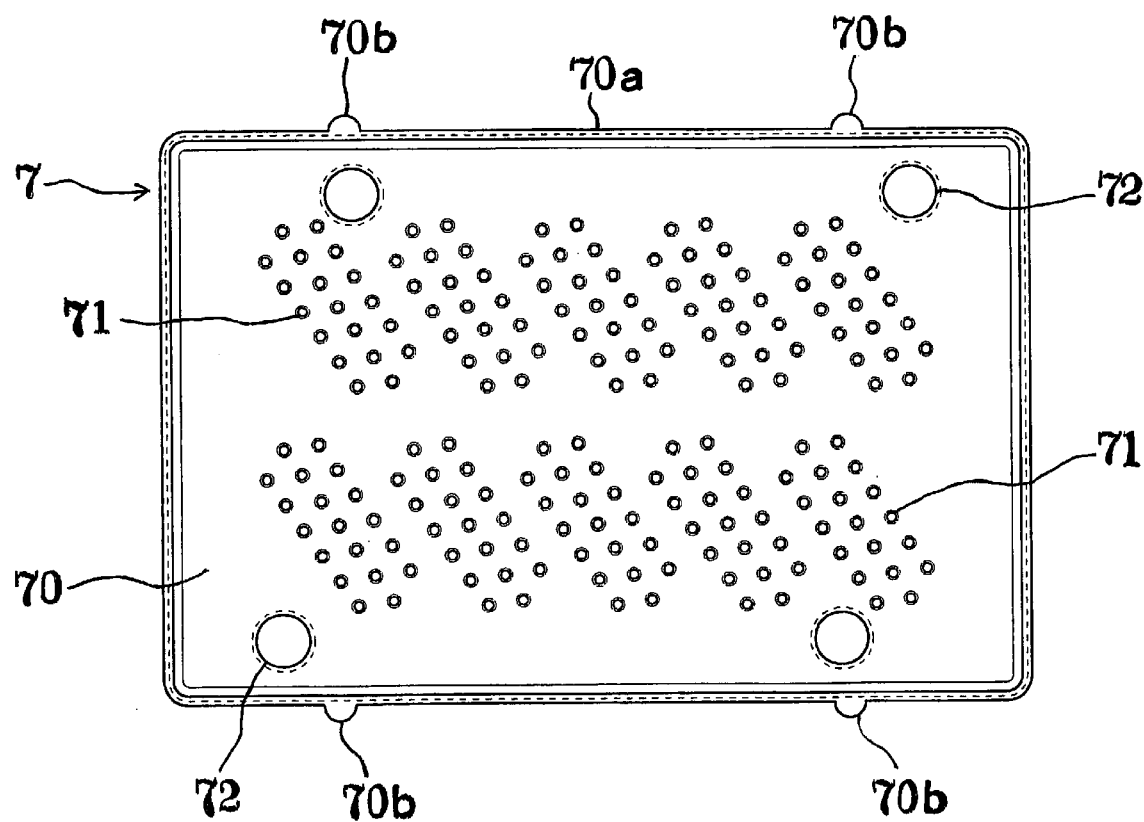
FIG. 5 is a plan view showing a bottom tray of the sushi-preparing tray set according to the embodiment of the present invention.
Figure 6:
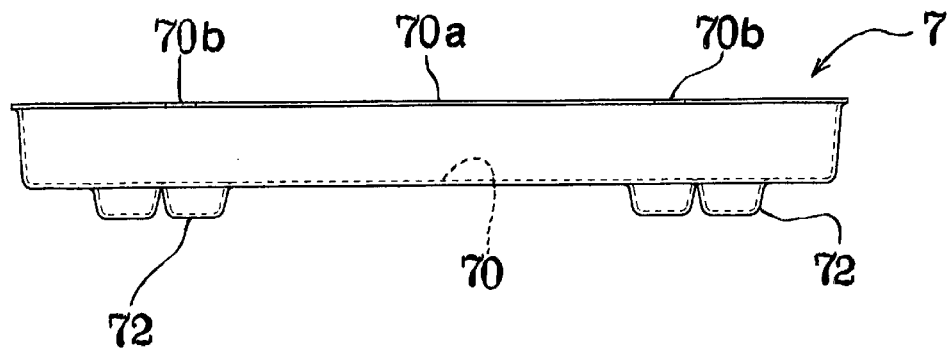
FIG. 6 is a side view showing the bottom tray of the sushi-preparing tray set according to the embodiment of the present invention.
Figure 7:
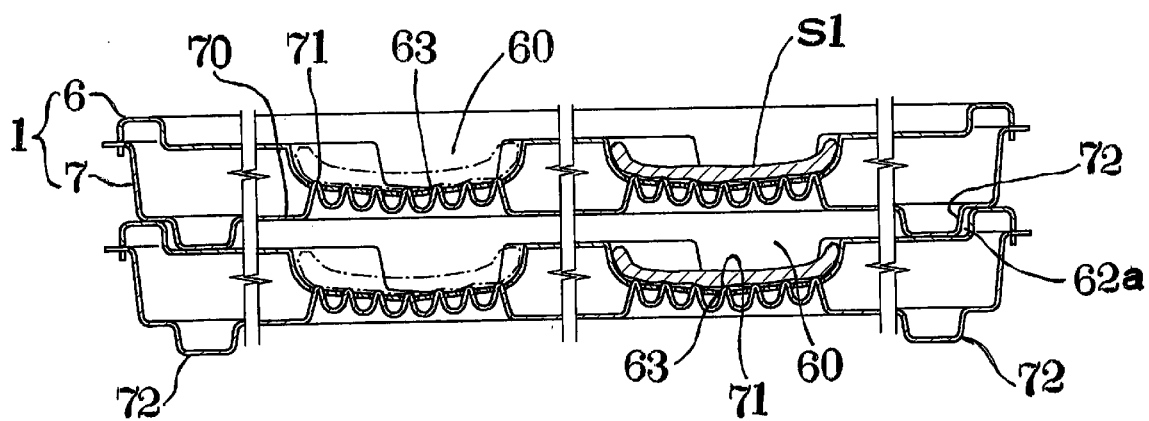
FIG. 7 is a view explaining the top and bottom trays of the sushi-preparing tray set according to the embodiment of the present invention, when the top tray is superimposed over the bottom tray thereof.
Figure 8:
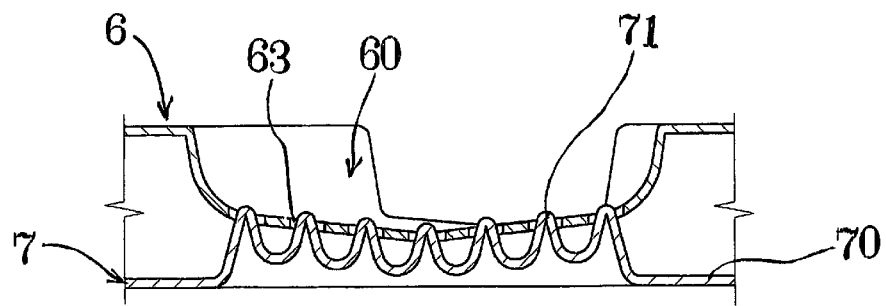
FIG. 8 is an enlarged side view in section showing a depressed portion of the top tray and a raised portion of the bottom tray.

On the other hand, the bottom tray 7 is in a generally rectangular form, when looked in a plane, as shown in FIGS. 5 and 6, so as to be [tightly] engaged with the top tray 6, as shown in FIGS. 2 and 7. The bottom tray 7 has a depressed area 70 that receives the liquid penetrated from the holes 63 of the top tray 6. The depressed area 70 of the bottom tray 7 is integrally provided with raised sections 71 so as to engage with the corresponding holes 63 and project inside the top tray 6 therethrough, when the top tray 6 is superimposed over the bottom tray 7, as shown in FIGS. 7 and 8. The raised sections 71 can assist in readily separating the pieces of sushi S from the corresponding depressed portions 60 of the top tray 6. The bottom tray 7 also comprises a flange section 70a with engagement pieces 70b formed projecting in a semi-circular shape from the flange section 70a so as to engage with the cut-away portion 62b of the top tray 6 in a manner as described above. After the pieces of sushi S have been separated from the tray set 1, the tray set 1 is divided into the top and bottom trays 6 and 7 and the liquid collected in the bottom tray is discharged, followed by washing them with water for re-use.

Now, a description will be give below regarding the process for the preparation of sushi by using the tray set 1 having the above configuration with reference to FIGS. 1 and 9–12. In this embodiment, sushi may be prepared for example in a take-out sushi shop.

Figure 9:
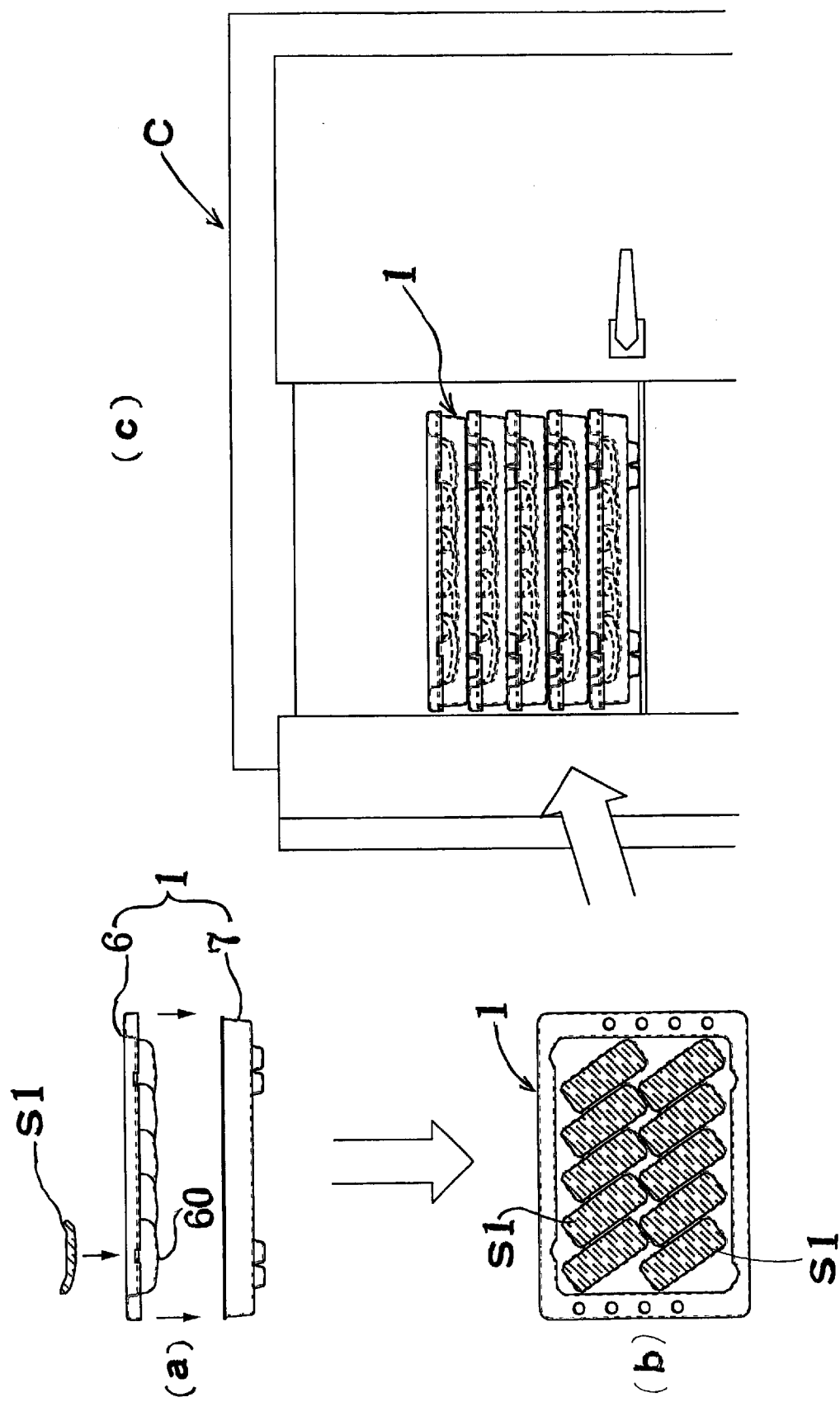
FIG. 9 is a view explaining a portion of the method for preparing sushi according to an embodiment of the present invention.

As shown in FIG. 9, the top tray 6 is in advance assembled with the bottom tray 7 by superimposing the top tray 6 over the bottom tray 7. Then, a topping S1 such as a piece of fish flesh or any other topping is placed in each depressed portion 60 of the top tray 6. At this case, a different kind of a topping S1 may be placed in each of the depressed portions 60 of the tray set 1, as shown in FIGS. 9(*a*) and 9(*b*). In this case, different toppings S1 are inserted in all the depressed portions 60. The tray set 1 with the toppings S1 arranged thereon is then placed and stored in a refrigerator C, as shown in FIG. 9(*c*), in order to be ready for preparation any time when an order is placed. At this time, a plurality of the tray sets 1 with the identical or different toppings S1 so arranged thereon can be superimposed over another tray set 1 with the toppings S1 so arranged thereon, as described above, in order to save a space within the refrigerator C and allow a ready storage therein.

Once an order is placed from a take-out counter of the sushi shop, for example, the sushi production line L is started and the number of the tray sets 1 are taken out from the refrigerator C, as ordered and placed on the tray transfer line L1. The tray sets 1 are then transferred to the position of the robot 2 where rice lumps are placed in the depressed portions 60 thereof (FIG. 1).

As the sushi production line L has been started, the robot 2 and the rice-lump preparing machine 3 are also ready for starting operation. The rice-lump preparing machine 3 prepares rice lumps S2 continually, and the rice lumps S2 are transferred to an operating region of the hand section 20 of the robot 2 by means of the conveyor section 31, as shown in FIG. 10.

Figure 10:
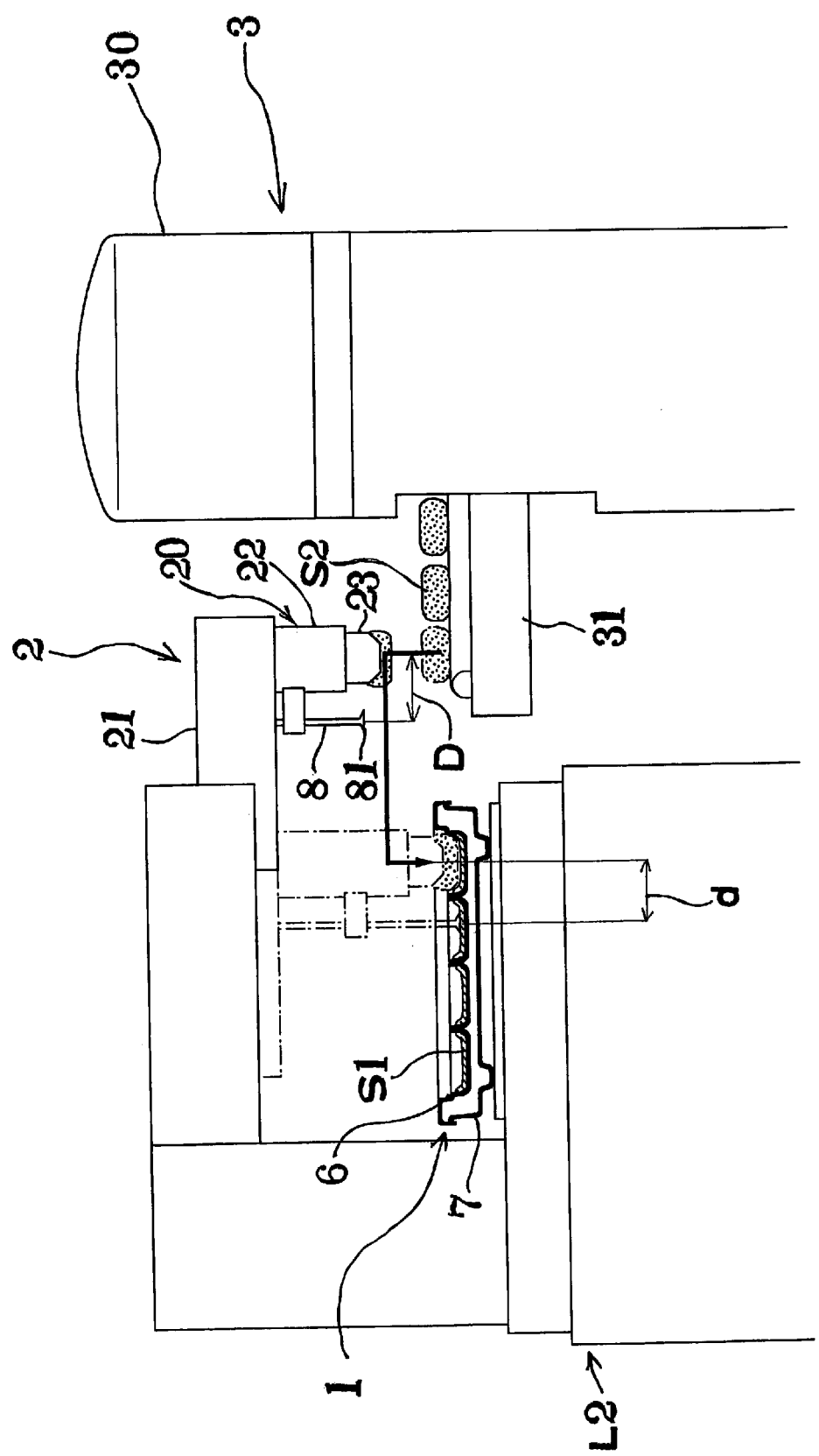
FIG. 10 is a view explaining a portion of the method for preparing sushi according to an embodiment of the present invention.

As shown in FIG. 10, the robot 2 comprises a hand section 20 for clamping rice lumps S2, a horizontal transfer device 21 for horizontally transferring the hand section 20, and a lift device 22 for moving the hand section 20 vertically. The hand section 20 is disposed at the top edge of the conveyor section 31 of the rice-lump preparing machine 3 and also provided with a finger portion 23 at the top thereof, which can clamp the rice lump S2 by closing it and release it by opening it to fill the depressed portions 60 of the tray set 1 with the rice lumps S2 one after another from a one side to another side of the tray set 1.

FIG. 10 also shows a seasonings supply unit 8 disposed on the hand section 20 for supplying a small amount of a seasoning, such as spice, e.g., wasabi, i.e, Japanese horse-radish or the like. In this embodiment, the seasonings supply unit 8 is of a nozzle type and mounted in front of the finger portion 23 of the hand section 20 of the robot, the seasonings supply unit 8 comprising a nozzle part 81 for supplying a predetermined amount of a seasoning on the sushi topping S1 upon contact with the topping. Further, the distance D between the center of the nozzle part 81 and the center of the finger portion 23 is set so as to become equal to a pitch d between one depressed portion 60 and the adjacent depressed portion 60 of the tray set 1.

Therefore, at the first stroke of supplying the tray with the rice lump S2, the horizontal transfer device 21, the lift device 22 and the finger part 23 are controlled so as for the finger part 23 to be located in front of the tray set 1 without clamping any rice lump S2. At this time, the nozzle part 80 of the seasonings supply unit 8 is arranged so as to be located at the position of the first depressed portion 60 of the tray set 1 and to come into contact with the sushi topping S1 within the first depressed portion 60 to supply wasabi 80 or other seasoning onto the sushi topping S1.

Then, at the second stroke of placing a rice lump S2, the finger part 23 of the hand section 20 clamps a rice lump S2 and then carries it to the first depressed portion 60 of the tray set 1. At this time, the nozzle part 80 of the seasonings supply unit 8 is located above the topping S1 placed in the second depressed portion adjacent the first depressed portion being supplied with the rice lump S2. Then, the finger part 23 is lowered to allow the rice lump S2 to come into contact with the sushi topping S1 located therein and releases it on the sushi topping S1. Concurrently with the lowering of the finger part 23, the nozzle part 81 of the seasonings supply unit 8 is lowered to supply the second depressed portion 60 with a small amount of the seasoning. At the strokes et seq., this procedure is repeated to supply the seasoning 80 onto the topping S1 placed in the last depressed portion 60 of the tray set 1 and to supply a rice lump S2 in the last second depressed portion 60 thereof. Then, at the last stroke for filling the rice lumps in the tray set 1, the finger part 23 of the hand section 20 is transferred to the position of the last depressed portion 60 of the tray set 1 and supplies a rice lump S2 onto the sushi topping S1 with wasabi or other seasoning already supplied thereto in the last depressed portion 60 thereof. At this time, the nozzle part 81 is located outside the tray set 1 so that the seasonings supply unit 8 is controlled so as to supply no amount of the seasoning.

Figure 11:
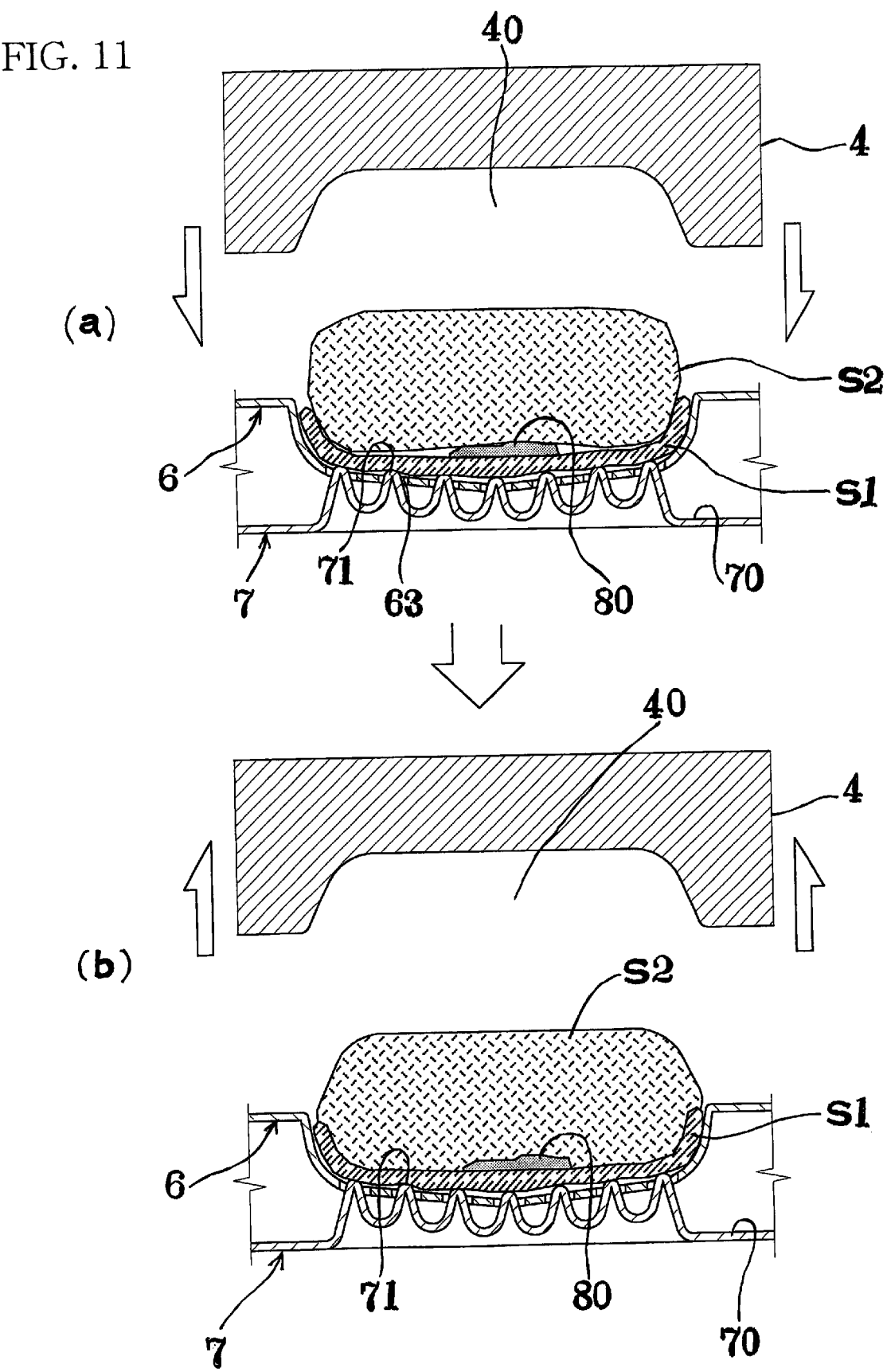
FIG. 11 is a view explaining a portion of the method for preparing sushi according to an embodiment of the present invention.

After all the depressed portions 60 of the tray set 1 (the top tray 6) have been filled with the sushi toppings S1 and the rice lumps S2, the tray set 1 is then transferred to the press-turn line L3. In the press-turn line L3, the pressing unit 4 with a depressed portion 40 is lowered to the rice lump S2, as shown in FIG. 11(*a*). The depressed portion 40 is formed so as to adapt to the shape of a piece of sushi and to arrange the piece of sushi for a better shape as goods. As the pressing unit 4 is lowered to cover the rice lump S2 from top, the rice lump S2 is pressed toward the sushi topping S1 to re-shaped the rice lump S2 into a piece of sushi having a quality as high as goods. After having pressed, the pressing unit 4 is moved upward from the tray set 1 to release the rice lump S2, as shown in FIG. 11(*b*).

Figure 12:
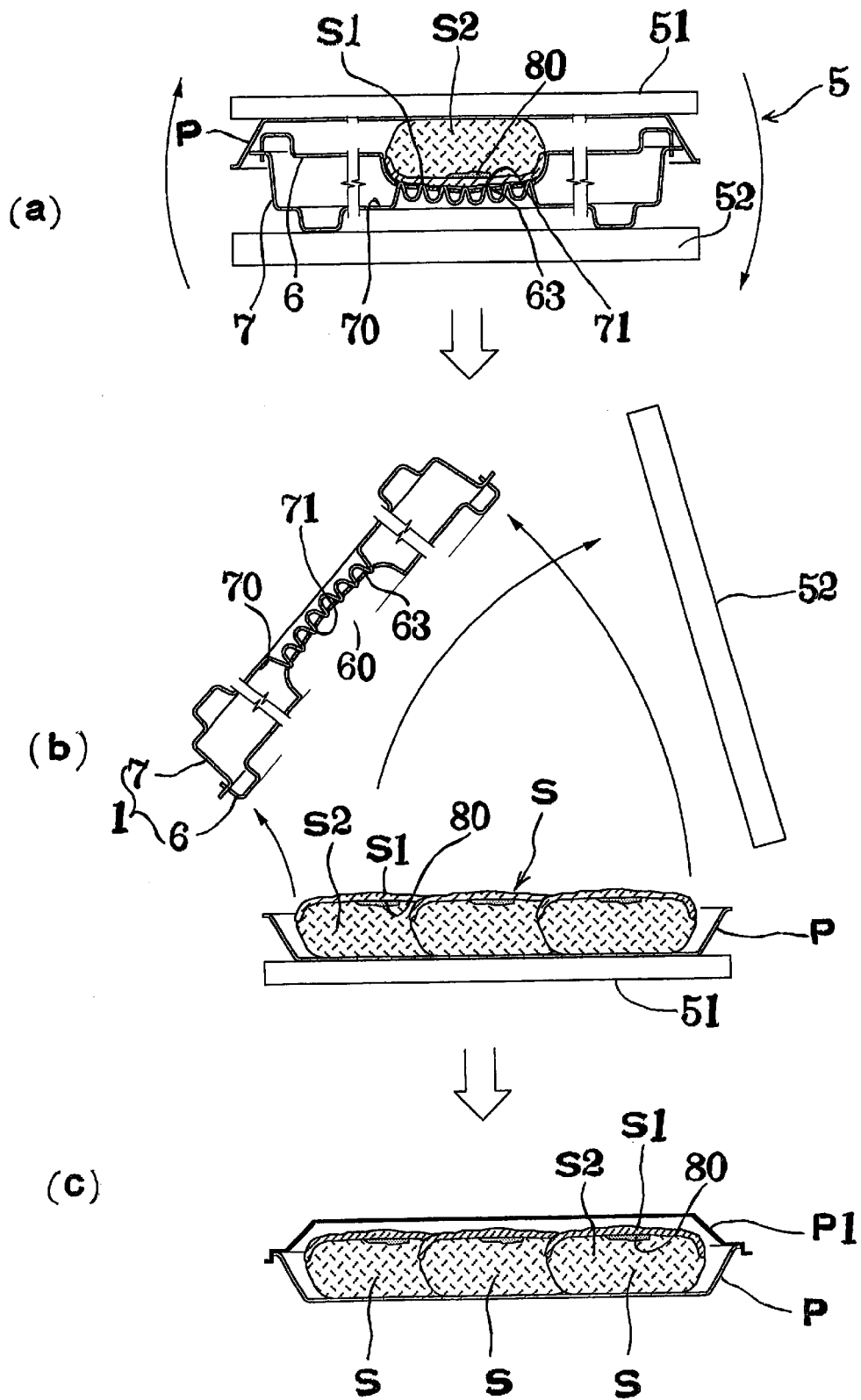
FIG. 12 is a view explaining a portion of the method for preparing sushi according to an embodiment of the present invention.

Then, the tray set 1 is transferred to the location where a turning unit 5 is disposed. The turning unit 5 comprises a first pressing plate 51 for pressing the tray set 1 from the side of the top tray 6 and a second pressing plate 52 for pressing it from the side of the bottom tray 7. Before pressing the tray set 1 by the first and second pressing plates, the tray set 1 is covered with a package P on top and the tray set 1 is interposed and pressed between the first and second pressing plates 51 and 52 from top and bottom, respectively, as shown in FIG. 12(*a*). Then, the tray set 1 is turned upside down in the state that it is sandwiched between them.

After it has been turned upside down, the second pressing plate 52 now located on top is detached from the tray set 1 and then the tray set 1 is removed to release the pieces of sushi S, as shown in FIG. 12(*b*). Upon removing the tray set 1, the raised portions 71 disposed on the bottom tray 7 of the tray set 1 acts to release the piece of sushi S from the top tray 6 thereof. Thereafter, the package P with the pieces of sushi S filled therein is covered with a lid P1 to form a sushi pack, as shown in FIG. 12(*c*). Such a sushi pack is wrapped and ready for delivery to a customer.

The steps of preparing such a sushi pack as described above are continually repeated to prepare a number of sushi packs.

The above method for the preparation of sushi by means of the sushi-preparing machine requires no experienced skill and no laborious work and can be carried out by only one person M without any experienced skill. Further, the above method is suitable for continually preparing a large number of sushi packs with pieces of sushi arranged therein.

Effects of the Invention

The present invention can be practiced in the manner as described above and achieve the following effects.

As described above, the present invention in an aspect provides the tray set for use in the preparation of pieces of sushi, each piece being composed of a sushi topping and a rice lump with the sushi topping placed thereon and, as needed, a small amount of a seasoning interposed between the sushi topping and the rice lump, wherein the tray comprises the first tray and the second tray, the first tray being provided with a plurality of depressed portions, each having a shape corresponding to the shape of a piece of sushi, and with holes through to discharge liquid dropped or derived from the sushi topping; and the second tray arranged so as to be laid under the first tray and having a depressed face so as to receive the liquid discharged from the holes disposed in the first tray, and having a plurality of raised sections formed continually and integrally with the depressed face so as to enter through the corresponding holes and project inside the first tray when the second tray is laid under the first tray. The tray set of this type for preparing sushi does require experienced skills, unlike sushi shops or restaurants where cooks with experienced skills are usually required, so that a person having no experienced skills can prepare sushi having a quality as high as sushi prepared by cooks with skills and experience. The present invention can prepare sushi containing less amount of liquid and preventing it becoming too watery (reducing the quality as sushi) as well as less breakage of the shape of sushi, thereby sustaining a high quality of sushi as goods.

In a preferred aspect, the present invention provides the tray set for use in the preparation of sushi wherein the depressed portions for preparing pieces of sushi are provided in plural rows, each row being composed of a predetermined number of the plural depressed portions. This can allow a plurality of pieces of sushi to be prepared on a tray in a continuous manner.

In another preferred aspect of the present invention, each of the plural depressed portions of the first tray is arranged so as to have a shape corresponding to each piece of sushi and having a space narrowed gradually from the top to the bottom. This shape of the depressed portion allows the piece of sushi to be released easily from the first tray of the tray set.

The present invention in another aspect provides the process for the preparation of sushi by using a tray set as described above. This process can prepare a sushi pack containing different kinds of pieces of sushi having different sushi toppings. Further, this process does not require any experienced skills and can efficiently prepare sushi of a high quality, which contains less amount of liquid by preventing it becoming too watery. Moreover, this process allows the preparation of pieces of sushi at lower costs while sustaining a high quality as sushi.

In a preferred aspect of this invention, the work of filling the depressed portions of the first tray with sushi toppings and rice lumps is carried out by the robot, so that a number of pieces of sushi can be prepared with high efficiency and at lower costs.

What is claimed is:

1. A process for the preparation of pieces of sushi by using a tray set for use in the preparation of pieces of sushi each composed of a sushi topping and a rice lump with the sushi topping placed thereon and, as needed, a small amount of a seasoning interposed between the sushi topping and the rice lump, having: a first tray with a plurality of depressed portions each having a shape corresponding to a piece of sushi and a depth approximately corresponding to a thickness of the sushi topping and a portion of a thickness of a rice lump and with holes through which to discharge liquid dropped or derived from the sushi topping; and a second tray arranged so as to be laid under the first tray and having a depressed face so as to receive liquid discharged from the holes disposed in the first tray, and having a plurality of raised sections formed continually and integrally with the depressed face so as to enter through the corresponding holes and project inside the first tray, while maintaining a clearance between the holes and the raised sections to allow a passage of the liquid when the second tray is laid under the first tray, comprising the steps of:

placing a topping in each of the plurality of the depressed portions of the first tray;

placing a rice lump on the sushi topping in each of the depressed portions of the first tray by the first step;

pressing the rice lump and the sushi topping so as to attach the rice lump to the topping;

covering the first tray with a packaging material and turning the tray set upside down; and releasing the tray set to leave the pieces of sushi on the packaging material.

2. The process as claimed in claim 1, wherein the rice lump is inserted by a robot onto the topping placed in advance in each of the depressed portions of the first tray.

3. The process as claimed in claim 1, wherein a topping is placed in each of the plurality of the depressed portions disposed on the first tray in a transverse direction of the first tray at a constant interval in a row and disposed in a plurality of rows at a constant interval in a longitudinal direction of the first tray; and a rice lump is placed onto the topping previously placed in each of the plurality of the depressed portions of the first tray.

4. The process as claimed in claim 1 wherein the rice lump is inserted by a robot onto the topping placed in advance in each of the depressed portions of the first tray.

5. The process as claimed in claim 3, wherein a seasoning is added to the topping placed in one depressed portion of the first tray while another rice lump is being inserted into another depressed portion of the first tray.

6. The process as claimed in claim 5, wherein the topping placed in a depressed portion of the first tray is coated with the seasoning while the rice lump is placed in another depressed portion thereof located in the position adjacent the depressed portion in which the topping in process of supplying with the seasoning is placed.

7. The process as claimed in claim 1, wherein a seasoning is added to the topping placed in one depressed portion of the first tray while another rice lump is being inserted into another depressed portion of the first tray.

8. The process as claimed in claim 7, wherein the topping placed in a depressed portion of the first tray is supplied with the seasoning while the rice lump is placed in another depressed portion thereof located in the position adjacent the depressed portion in which the topping in process of supplying with the seasoning is placed.

* * * * *

UNITED STATES PATENT AND TRADEMARK OFFICE
CERTIFICATE OF CORRECTION

PATENT NO. : 6,465,038 B2
DATED : October 15, 2002
INVENTOR(S) : Minour Aoki

It is certified that error appears in the above-identified patent and that said Letters Patent is hereby corrected as shown below:

<u>Title page,</u>
Item [73], Assignee, delete "Fuji Seiko Co., Ltd., Fukuoka (JP)" and insert -- Fuji Seiki Co., Ltd., Fukuoka (JP) --

Signed and Sealed this

Twenty-seventh Day of May, 2003

JAMES E. ROGAN
*Director of the United States Patent and Trademark Office*